INVENTOR.
NIELS KRAG
BY Samuel Lindenburg
ATTORNEY

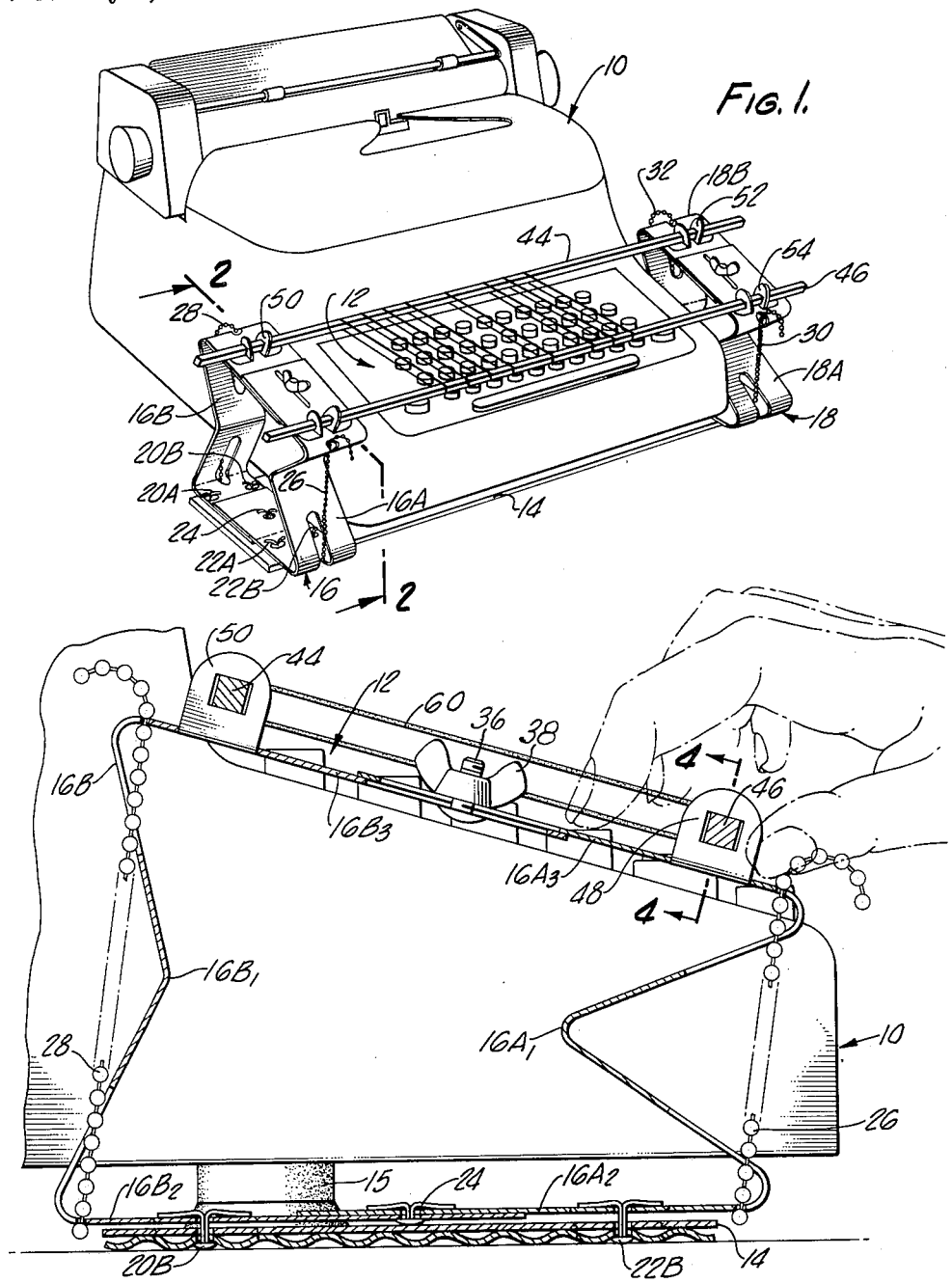

United States Patent Office 3,229,800
Patented Jan. 18, 1966

3,229,800
TEACHING ATTACHMENT FOR TYPEWRITERS
Niels Krag, 639 Enchanted Way, Pacific Palisades, Calif.
Filed May 2, 1963, Ser. No. 277,513
4 Claims. (Cl. 197—101)

This invention relates to teaching machines and more particularly to improvements therein.

The customary procedure for teaching a student how to type is to provide the student with a chart showing the location of the keys on the typewriter. He is then given typing exercises which effectively consist of copying paragraphs while looking at the chart and not watching his hands on the keyboard of the typewriter. It seems that the student usually does not have much difficulty in finding the right row of keys on which the desired key is located. The problem arises in finding the location of the key on that row. Recommended hand positions are given to enable this to be done easily. However, until the student learns to maintain this hand position properly and to automatically find the desired key, a considerable period of time elapses.

An object of this invention is to provide apparatus for simplifying the learning of the skill of typewriting.

Yet another object of the present invention is the provision of apparatus which shortens the time that it takes for a student to learn the proper position of the hands in learning the skill of typewriting.

Yet another object of the present invention is the provision of a simplified and unique device for use in teaching the skill of typewriting to students.

These and other objects of this invention may be achieved in an arrangement comprising two spaced adjustable supports which are placed on either side of the keyboard of a typewriter. These adjustable supports, which are adaptable to all different keyboard styles, are employed to hold two rods in position. One of these rods extends across the keyboard adjacent the uppermost row of keys and the other of these rods extends across the keyboard adjacent the lowermost row of keys. Flexible barriers extend between these two rods, in a manner so that the keys, which are allotted to each of the fingers of the two hands, are sectioned off between these barriers. These barriers then provide automatic guidance for the fingers, though the sense of touch, indicating the region on each row of keys which is allotted to each one of the fingers.

The keyboard may well be screened off to prevent cheating or glancing at the keys. The student places a chart to the right side of the typewriter showing the correct finger positions in relation to the barriers and keys. Each finger has less recognition to learn and each finger can count up or down from the lowest or highest key rows respectively. Thus, without looking at the keyboard and with the fingers correctly placed per the chart within the barriers, the student can find the correct key without looking at the keyboard. A student can thus compose his own or use predetermined sentences and type and practice the ten finger touch system and do it correctly from the beginning, thereby eliminating the time consuming learning by making errors. The student types correctly from the beginning. Once the feel of the keyboard comes naturally, the apparatus can be removed.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is an isometric view showing a typewriter with the embodiment of the invention in position for use;

FIGURE 2 is a sectional view along the lines 2—2 of FIGURE 1 showing the details of one of the support structures;

Figure 3:
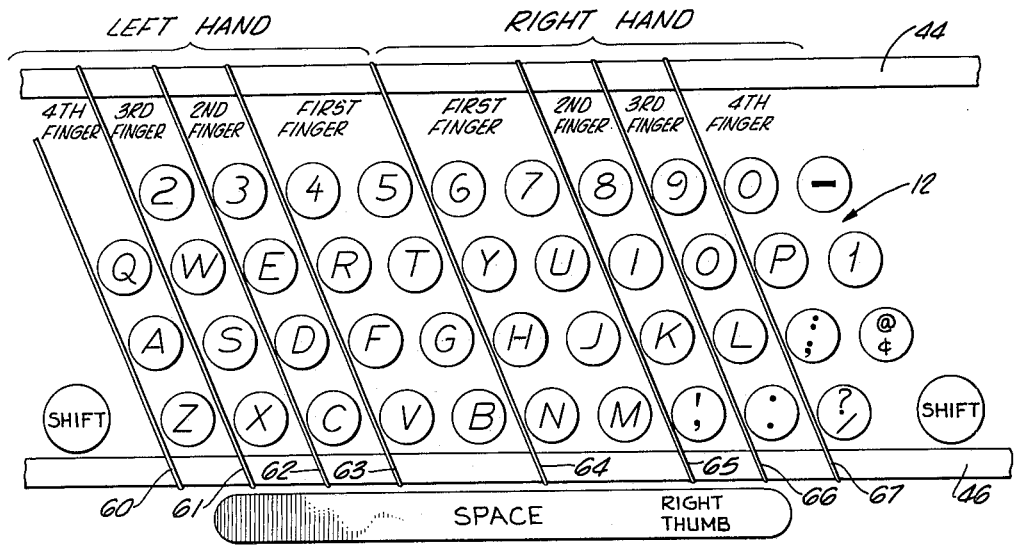
FIGURE 3 is a view in elevation illustrating how the embodiment of the invention provides the proper zones or regions on the keyboard which are assigned to each finger.

Reference is now made to FIGURE 1 which is an isometric view illustrating how the embodiment of the invention is associated with a typewriter keyboard, and to FIGURE 2 which is a sectional view along the lines 2—2 in FIGURE 1. As is well known, a typewriter 10, includes keys 12, which are arranged in rows and constitute the keyboard. This invention comprises a base member 14, which is flat and which is positioned under the keyboard portion of the typewriter. The base member 14 extends on either side of the typewriter and may be held in place by the front feet 15, of the typewriter.

Attached to the portion of the base member which extends on either side of the keyboard are two support members respectively 16, 18. These two support members are each made of two pieces of material respectively 16a, 18b, 18a, 18b. This material is preferably of a type which has some resiliency or spring to it, and in an embodiment of the invention was made of galvanized zinc. The base member may be any suitable rigid material, such as a sheet of corrugated board.

The embodiment of the invention is designed to accommodate a wire range of typewriters. Effectively the support members before being assembled may be stamped out flat and may have properly placed holes therein so that they can be bent to constitute somewhat M-shaped members all of the same size. As shown in FIGURE 2, the legs of each M of the support member 16 are respectively designated as 16A2, 16A3, 16B2, 16B3, and the center sections are respectively designated as 16A1 and 16B1. The legs 16A2 and 16B2 have holes therein so that they can be attached to the base 14, by suitable means such as brads 20A, 20B, 22A, 22B, which extend through suitable holes in the base section. The legs 16A2, 16B2, overlap and are held together by another brad 24, which extends through the overlapping holes.

Figure 5:
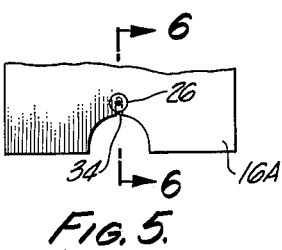
FIGURE 5 is a detail showing how one of the chains for determining the slant and height of one of the support structures may be locked in position.
Figure 6:
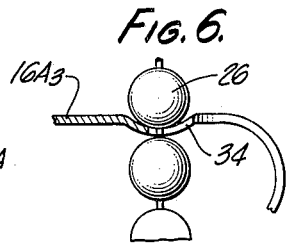
FIGURE 6 is a view along lines 6—6 of FIGURE 5 showing how one of the chains fits into the holding mechanism of an end member.

Two metal bead chains respectively 26, 28, 30, 32, are provided for each support 16, 18. These metal bead chains can be locked in position by pushing the narrow portion between the metal balls of the chain into a suitable dimensional slot 34, which may be seen in FIGURE 5 as well as in FIGURE 6, for engaging the region of the chain between the adjacent balls. The reason for using the two chains for each member is to hold the members in a suitable bent position so that the upper arms 16A3, 16B3, have substantially the same slope as the keyboard. This may be seen in FIGURE 2, wherein the arms 16A3 and 16B3 effectively parallel the slope of the keyboard.

The deforming of the support members is simply effectuated after they have been attached to the base member and to one another by inserting a bolt 36 through the slots provided therefore in the legs and a wing nut 38 to hold the assembly together. Thereafter, the lower end of the bead chain 26, and the bead chain 28 are pushed into receiving slots, of the type shown in FIGURE 5, which are made in the legs 16A2, 16B2. The legs 16A3, 16B3, are then pushed downward against the inherent spring tension of the support material to assume approximately the desired parallel position to the keyboard. The legs are locked in position by moving the chain 28 into a suitable receiving notch at the outside end of the leg 16A3, and by moving the chain 26 until it engages a suitable receiving notch at the outside of the leg 16B3. Minor adjustments can then be made pulling the chains out and pushing them back a bead distance at a time until the desired fine alignment has been made.

It will be obvious that this procedure is repeated for the support 18. The bead chain holding notches may be a simple slot such as 34, shown in FIGURE 5 and FIGURE 6 or may be slot 40 which has a tab 42, extending from one side thereof to prevent the bead chain from pulling out of the slot or being accidently withdrawn therefrom.

When the support members on each side of the typewriter have the shape shown in FIGURES 1 and 2 then two rods respectively 44, 46, are mounted respectively adjacent the upper row of keys and the lower row of keys of the keyboard in a manner shown in FIGURE 3.

Figure 4:
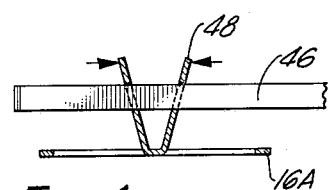
FIGURE 4 is a detail taken along lines 4—4 of FIGURE 2 showing how a bar is held in position.

FIGURE 3 is a view in elevation showing the disposition of rods 44, 46, as well as flexible barriers 60 through 67 which are employed with this invention. Each one of the supports 16, 18, is provided with sets of lugs or ears respectively 48, 50, 52, 54. A cross section of a set of these ears is shown in FIGURE 4 which is a view taken along the lines 4—4 of FIGURE 2. Each of these ears has holes therein through which the rod may be inserted. The rod 46, is passed through the ears 48, 54, and the rod 44 is passed through the ears 50 and 52. As may be seen in FIGURE 4, these ears are bent away from the vertical so that they bear on the rods and prevent them from slipping out of the ears. The rods are given a rectangular shape for convenience. This is not really necessary. The square rods and holes prevent rotation of the bars (FIGURE 8) when pulled by the rubber bands.

Before actually inserting the rods into the pairs of ears, as shown in FIGURES 1 and 3, eight flexible barriers respectively 60 through 67 are stretched over the two rods which are then placed in the position shown in FIGURES 1 and 3. These flexible barriers may preferably be rubber bands which are inexpensive and may easily be replaced when broken. The flexible barriers are moved along the rods until they assume the positions shown in FIGURE 3 whereby they properly section off the keys of the keyboard which are allotted to the fingers of both hands in the process of typing. The proper allocation with respect to the fingers is designated in FIGURE 3. It should be apparent that with the barriers in place the student will have no difficulty in properly placing his hands on the keyboard of the typewriter. It should also be apparent that the flexible barriers serve as guides to indicate and nudge each finger the proper region for its operation.

Figure 9:
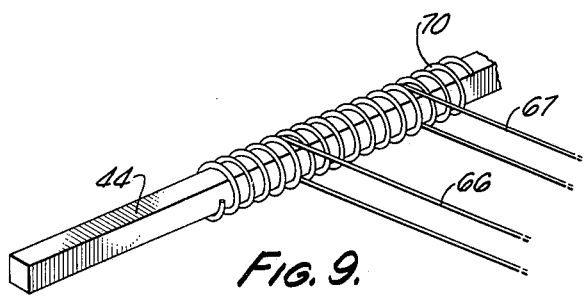
FIGURE 9 is a perspective view showing how the barriers which are employed with this invention may be locked in place.

The rubber bands extend between the keys and do not interfere with their operation. The rods 44, 46, may be notched before or after the bands are put in position to prevent slippage. However, even without such notches, there is very little, if any, slippage. Also, the rods may be knurled or threaded for this purpose. The barriers may be made of less flexible material than the rubber bands, however, this is not preferred since the rubber bands are inexepnsive and effective and do not irritate the fingers of the user of the device. Also, the flexible barriers automatically adjust for different finger thicknesses. The lower portion of the rubber bands may be pushed between the keys when the student uses the invention but this does not cause the rubber bands to slide but rather maintains them in position. However, there are some typewriters in which the keys are designed or placed so close together that pushing the rubber bands between the keys may not be possible. In this event, the supports are moved higher in order to allow the placement of the barriers even though they do not extend below the keys or between the keys. Here there may be some slippage of the barriers. To provide for this situation, an arrangement is used such as shown in FIGURE 9. This shows a rod such as 44, which supports two bands respectively 67, 66. To keep these bands from sliding, a spiral 70, which may be made of material such as is used for binding books or may be made of wire, is wrapped around the rod. The spiral will not slide and will also maintain the barriers 66 and 67 in position.

Figure 10:
FIGURE 10 shows a barrier which will retain its position.

FIGURE 10 shows another type of flexible barrier which uses friction to resist slippage. It consists of a band 84, with a web 86 at the center. The web fills all of the center except for two loops at the ends which are made just large enough to fit tightly over the rods which are inserted therein. Once these barriers are forced into position they remain there in view of the friction provided by the tight fit.

Another way of holding the rubber bands in place would be to place a strip of tape over the band once it was in position and wrap this around the bar. There are any number of other simple expedients that may be employed for maintaining the flexible barriers in position. Because the supports 16, 18, on each side of the typewriter are resilient they continually press against the bead chains preventing these from slipping out thereby holding their position whereby the two rods are properly placed relative to the keyboard. The entire teaching device is held in position relative to the typewriter because the front legs 15 of the typewriter rest on the base 14. This is readily seen in FIGURE 2.

Figure 8:
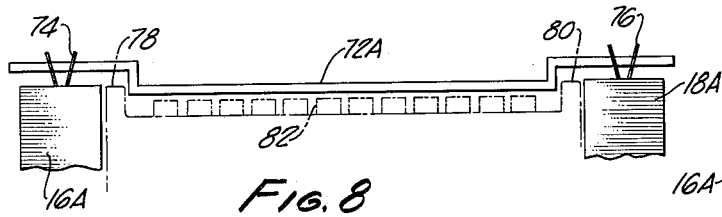
FIGURE 8 shows how the embodiment of the invention may be modified to take care of unusual typewriter keyboard configuration.
Figure 7:
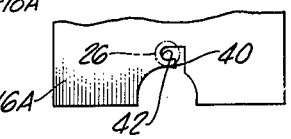
FIGURE 7 shows a modification of FIGURE 5 whereby a chain may be locked in position against accidental removal.

There are certain typewriters which have projections adjacent their keyboards whereby a straight rod cannot be positioned low enough on the keyboard to permit the flexible barriers to extend between the keys. FIGURE 8 shows a modification of this invention which can take care of this situation. The rod 72A, which is supported between the ears respectively 74, 76, extends over the side projections 78, 80, on the typewriter which are adjacent the keys of the keyboard, and then is bent downwards at its center section 72A so as to have the desired spacing relationship with the keys 82. The square holes in the ears 74, 76, prevent the square cross sectional bar 72 from rotating when being pulled by rubber bands.

By virtue of the fact that this invention sectionalizes the keyboard with flexible barriers whereby the recognition problem for each finger of a student learning to type is simplified, the student learns faster and learns to be accurate. The invention guides the fingers to the proper operating regions with a gentle action. Because of the way that the embodiment of the invention is constructed, it may be adjusted very simply to fit any typewriter regardless of size. When the student has mastered the typewriting skill the invention may be easily removed without affecting the typewriter.

I claim:

1. A device for use with a typewriter keyboard to assist a student in maintaining his fingers on the keys of said keyboard which are assigned thereto comprising a plurality of flexible barriers, means holding said plurality of flexible barriers spaced along said keyboard to define therebetween the keys assigned for operation by each finger of the student, a pair of support members, each of said pair of support members comprising a first and second M-shaped device made of flexible material, means for attaching the first and second M-shaped device as to each other by their legs to provide a closed figure with the centers of the M's opposite one another, means for attaching two attached legs at one side of said closed figure to said base member, and means for holding said closed figure in a position having the two attached legs at the other side of said closed figure parallel to the slope of said typewriter keyboard, means on said pair of support members for holding said means for supporting said flexible barriers, and a base member attached to said support members for maintaining them in position adjacent said typewriter keyboard.

2. A device as recited in claim 1 wherein said means for holding said closed figure in a position having two attached legs at the other side of said closed figure comprise a pair of bead chains each comprising a plurality of metal beads strung serially on a line, and a notch near the outer end of each of the legs forming said closed figure, said notch being just large enough for the insertion of the line between adjacent metal beads therein, one of said pair of bead chains being strung between notches in the two legs of each first M-shaped device, the other of said pair of bead chains being strung between notches in the two legs of said second M-shaped device.

3. A device as recited in claim 1 wherein said means holding said plurality of flexible barriers comprises a first and second rod, and said plurality of flexible barriers comprises a plurality of elastic bands stretched between said rods.

4. A device for use with a typewriter keyboard to assist a student in maintaining his fingers on the keys of said keyboard which are assigned thereto comprising a base member positioned underneath said typewriter keyboard and extending on either side thereof, first and second flexible support members each of which is attached to and positioned by said base member on either side of said keyboard, each said flexible support member having a bottom side which is attached to said base member and an opposite top side, a separate means maintaining each said top side parallel to the slope of said typewriter keyboard, first and second rods extending across said keyboard and to said first and second flexible support members, first and second spiral members respectively wound around said first and second rods, first lug means on the upper top sides of said first and second flexible support members for holding said first rod adjacent the upper row of keys of said keyboard, second lug means on the upper top sides of said first and second flexible support members for holding said second rod adjacent the lower row of keys of said keyboard, and a plurality of flexible bands stretched between said first and second rods and positioned therealong by said respective first and second spiral members at predetermined locations for separating said typewriter keys into separate zones allotted for the fingers of each hand.

References Cited by the Examiner
UNITED STATES PATENTS

| | | | |
|---|---|---|---|
| 1,008,591 | 11/1911 | Feakes | 197—101 |
| 1,440,942 | 1/1923 | Stowell | 197—101 |

FOREIGN PATENTS

| | | |
|---|---|---|
| 558,330 | 9/1932 | Germany. |

ROBERT E. PULFREY, *Primary Examiner.*